United States Patent
Bäcker et al.

(10) Patent No.: US 6,454,103 B1
(45) Date of Patent: Sep. 24, 2002

(54) MULTIPHASE EXTRACTOR WITH A WASH CHAMBER

(75) Inventors: Werner Bäcker, Wipperfürth (DE); Artak Eranosovich Kostanian, Widnoe (RU)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/402,029

(22) PCT Filed: Mar. 27, 1998

(86) PCT No.: PCT/EP98/01812

§ 371 (c)(1),
(2), (4) Date: Dec. 22, 1999

(87) PCT Pub. No.: WO98/45014

PCT Pub. Date: Oct. 15, 1998

(30) Foreign Application Priority Data

Apr. 9, 1997 (DE) .......................... 197 14 579

(51) Int. Cl.⁷ ............................................ B01D 11/00
(52) U.S. Cl. ..................... 210/511; 422/255; 422/256
(58) Field of Search ................. 210/194, 511, 210/634, 805, 708, 800; 422/256, 259, 255

(56) References Cited

U.S. PATENT DOCUMENTS

| | | | | |
|---|---|---|---|---|
| 1,297,171 A | * | 3/1919 | Holley et al. | |
| 2,234,921 A | * | 3/1941 | Webb | |
| 4,083,758 A | | 4/1978 | Hamby et al. | |
| 4,698,159 A | * | 10/1987 | Brenner | 210/634 |
| 5,039,496 A | | 8/1991 | Kehl et al. | |
| 5,225,084 A | | 7/1993 | Assmann, et al. | 210/649 |
| 5,334,317 A | * | 8/1994 | Sichtermann et al. | 210/634 |
| 6,090,352 A | * | 7/2000 | Kostanian | 422/257 |
| 6,129,842 A | * | 10/2000 | Kostanian | 422/257 |
| 6,143,178 A | * | 11/2000 | Kostanian | 210/634 |

FOREIGN PATENT DOCUMENTS

| | | |
|---|---|---|
| DE | 38 36 731 A1 | 5/1990 |
| EP | 0 342 799 A2 | 11/1989 |
| RU | 826834 | 6/1982 |

OTHER PUBLICATIONS

DATABASE WPI Section Ch, Week 9806 Derwent Publications Ltd., London, GB; AN 98–061324 XP002071996 & RU 2 080 162 C (NITROGEN IND ORG SYNTHESIS PRODUCTS INST) in der Anmeldung erwahnt siehe Zusammenfassung, Dates Unknown.

\* cited by examiner

*Primary Examiner*—Joseph W. Drodge
(74) *Attorney, Agent, or Firm*—Norris McLaughlin & Marcus

(57) ABSTRACT

Multi phase extractor, comprising an extraction chamber, a washing chamber and a re-extraction chamber, said chambers each having inlets adapted to disperse and discharge a phase therein, and connecting channels adapted to convey a continuous phase from said extraction chamber to said washing chamber, from said washing chamber to said re-extraction chamber from said re-extraction chamber to said extraction chamber, and each of said chambers having drains for removing the phase discharged into it by said inlets.

9 Claims, 3 Drawing Sheets

MULTIPHASE EXTRACTOR WITH A WASH CHAMBER

The invention is based on a multiphase extractor having an extraction chamber and a re-extraction chamber which are connected in their upper and lower parts by connecting channels and have distribution devices and connectors for the supply and discharge of a donor phase and an acceptor phase.

A multiphase extractor of this type can be used in the chemical, hydrometallurgical, microbiological and other sectors of industry for the separation, extraction, concentration and purification of substances.

BACKGROUND OF THE INVENTION

From the technical point of view and regarding the achievable effect, the closest of the known apparatuses is the three-phase extractor described in Russian Patent Application 94-015776/26, which consists of an extraction chamber and a re-extraction chamber which are filled with the continuous phase (liquid membrane). The chambers have devices for dispersing the respective phase and are connected to one another via overflows for the circulation of the continuous phase. The overflows are in the form of connecting channels or pipes which connect the upper and lower parts of the chambers to one another. The extractor is provided with connectors for the supply and discharge of the first and second disperse phases. The first phase to be dispersed, which is the starting solution, or donor phase, and contains the substance to be removed, and the second phase to be dispersed, the acceptor phase, are each dispersed in the corresponding chamber in the form of droplets by means of a dispersion or distribution device. These droplets move through the continuous phase as a stream of droplets. Owing to the density difference in the dispersions in the first and second chambers, circulation of the continuous phase takes place through the upper and lower overflows, resulting in transfer of the extracted substance from one chamber into the other and from the donor phase into the acceptor phase. Thus, extraction with the continuous phase as extractant takes place in the first chamber, and re-extraction of the removed substance with the acceptor phase as re-extractant takes place in the second chamber.

SUMMARY OF THE INVENTION

The invention has the object of modifying the multiphase extractor to enable further possible applications in which extraction and re-extraction processes can be coupled with washing processes in a single apparatus. In particular, washing of the extractant should also be enabled here.

This object is achieved in accordance with the invention in the multiphase extractor described at the outset through the extraction chamber and re-extraction chamber being connected to one another via an intermediate washing chamber.

According to a preferred embodiment of the invention, the extraction, re-extraction and washing chambers are equipped with separation zones.

According to a preferred embodiment, the upper part of the extraction chamber is connected directly to the upper part of the re-extraction chamber.

Alternatively, the upper part of the extraction chamber can be connected directly to the lower part of the re-extraction chamber.

A further alternative consists in that the lower part of the extraction chamber is connected directly to the lower part of the re-extraction chamber.

A further refinement of the invention is characterized in that the extraction chamber and the re-extraction chamber together with the washing chamber form a single separating stage, and a series of such stages are connected in series in the form of a cascade.

The incorporation of washing chambers between the extraction and re-extraction chambers allows coupled extraction, washing and re-extraction processes to be carried out in one and the same apparatus.

The different types of connection between the extraction and re-extraction chambers provide the prerequisite for achieving different technological variants of the separation process (co-current or countercurrent flow of the extractant with the donor, washing and acceptor phases).

The connection of a plurality of separation stages, each consisting of an extraction chamber, a washing chamber and a re-extraction chamber, in series in a cascade-like arrangement allows multistage mass transfer processes to be carried out in the multiphase extractor.

BRIEF DESCRIPTION OF THE DRAWINGS

FIGS. 1–6 show various embodiments of single-stage extractors, and

FIG. 7 shows a multistage multiphase extractor.

DETAILED DESCRIPTION OF THE INVENTION

Figure 1:
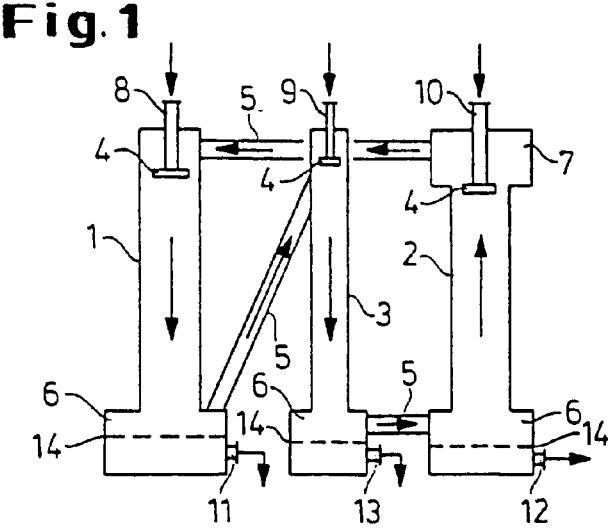
FIGS. 1–7 show diagrammatically various embodiments of the multiphase extractor according to the invention for carrying out coupled extraction, washing and re-extraction processes. In the figures.
Figure 2:
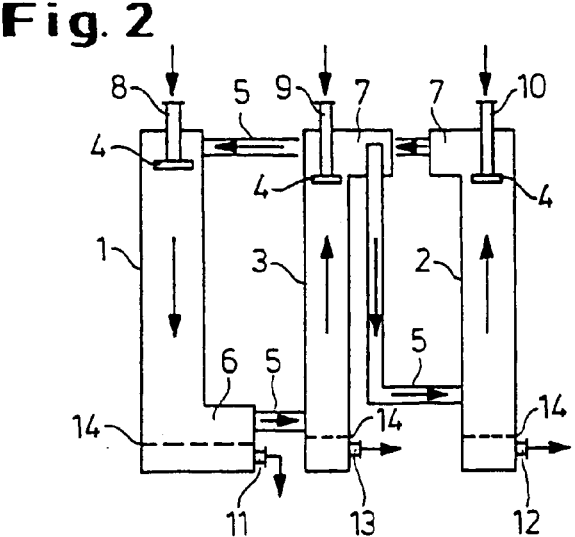

In FIGS. 1–6, the multiphase extractor consists basically of an extraction chamber 1, a re-extraction chamber 2 and a washing chamber 3, which is arranged between the two chambers 1 and 2. In FIGS. 1 and 2, the upper parts and in FIGS. 5 and 6, the lower parts of the extraction chamber 1 and re-extraction chamber 2 are connected directly to one another via the connecting pipe 5, which runs around the outside of the washing chamber 3. Separation zones 6 in the form of an increase in cross section of the chambers 1, 2, 3 are provided at the inlet openings of the connecting pipes 5. The separation zones, which act as deposition chambers, prevent droplets being dragged from one chamber into the other by the circulating stream of continuous phase.

Chamber 1 is supplied with a donor phase via connector 8, chamber 2 is supplied with an acceptor phase via connector 10 and chamber 3 is supplied with a washing liquid (washing phase) via connector 9. In order to disperse the phases, distribution devices 4 are installed at the ends of the connectors. The washing chamber 3 likewise has a separation zone 6. The lower part of the extraction chamber 1 can be connected to the upper part (FIG. 1) or lower part (FIG. 2) of the washing chamber 3. In the extractor in FIG. 1, the extractant flows in countercurrent to the acceptor phase and in co-current with the donor and washing phases. In the extractor in FIG. 2, by contrast, the extractant flows in countercurrent to the washing phase and in co-current with the acceptor and donor phases.

Figure 3:
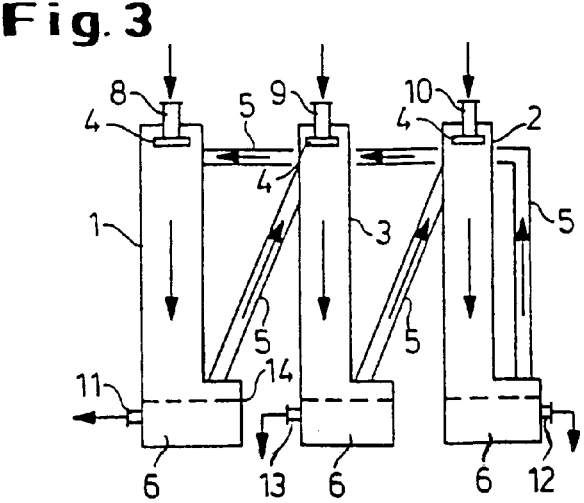
Figure 4:
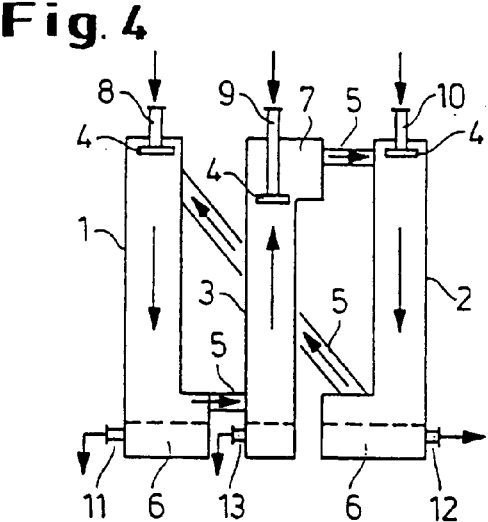
Figure 5:
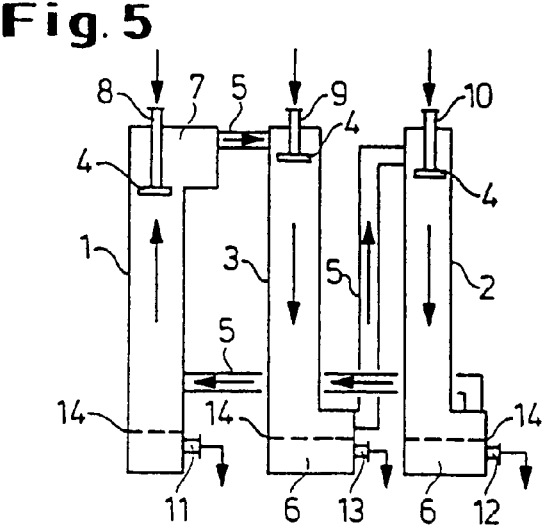
Figure 6:
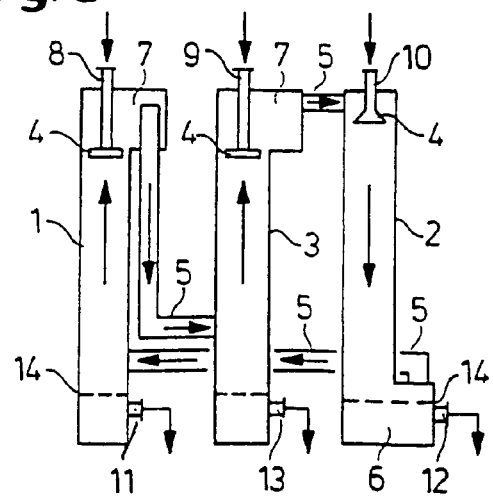

FIGS. 3 and 4 show embodiments of the multiphase extractor in which the upper part of the first chamber 1 (extraction chamber) is connected directly to the lower part of the second chamber 2 (re-extraction chamber), the connecting pipe 5 again running behind the washing chamber 3.

The starting solution (donor phase) is, as in the embodiments described above, fed into the extraction chamber 1 via connector 8. The substance to be extracted is extracted by the continuous phase (extractant). The extractor phase (i.e. the continuous phase loaded with the extracted substance) passes through the connecting pipe 5 into the washing chamber 3, where it is washed by the washing medium fed in via connector 9. The washed extractor phase passes from the washing chamber 3 into the re-extraction chamber 2, where the re-extraction by the acceptor phase takes place. During transfer from one chamber into the other, the continuous phase flows through the separation zones 6 and 7 in chambers 1, 2 and 3, causing any droplets of donor, washing or acceptor phase which have been dragged along by the flow to be deposited. The donor, washing and acceptor phases are discharged from chambers 1, 2 and 3 via connectors 11, 12 and 13.

Figure 7:
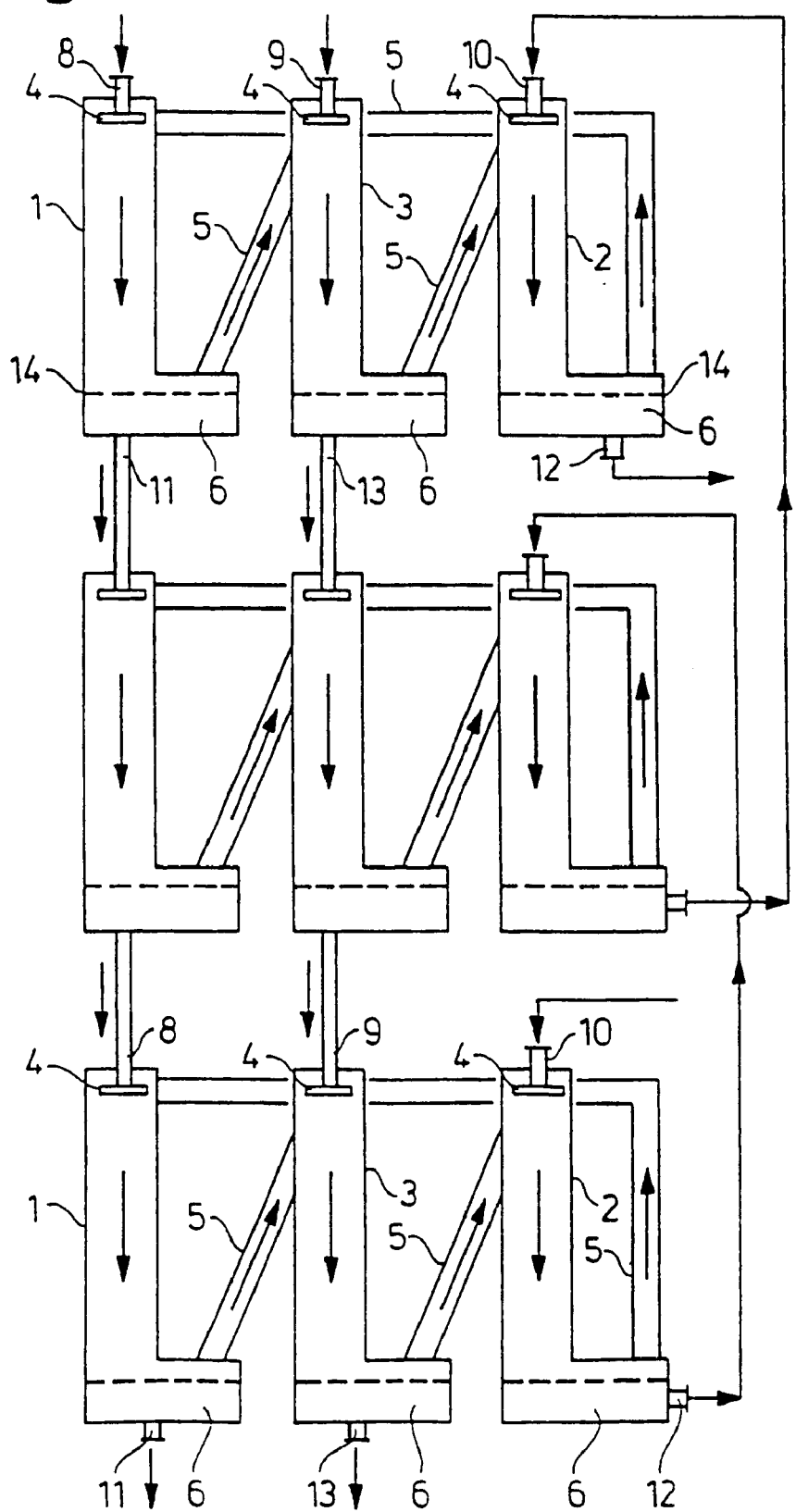

In the multistage extractor shown in FIG. 7, the extraction, washing and re-extraction processes are repeated in each stage. Depending on how chambers 1, 2 and 3 are connected to one another, different flow variants of the material separation process can be achieved (co-current or countercurrent).

We claim:

1. Multiphase extractor comprising an extraction chamber, a re-extraction chamber and an intermediate washing chamber, each of said chambers having a bottom section and a top section, and wherein said extraction chamber has an inlet for the supply of a donor phase, said inlet being adapted to disperse a donor phase and discharge it as a dispersion into said extraction chamber, a drain at the bottom section of the extraction chamber, a first connecting channel which connects said extraction chamber to said washing chamber and a second connecting channel which connects said extraction chamber to said re-extraction chamber, said first and second connecting channels being connected to said extraction chamber at a level which is above the level of said drain at the bottom section of said extraction chamber, said intermediate washing chamber has an inlet for the supply of a washing phase, said inlet being adapted to disperse a washing phase and discharge it into said washing chamber, a drain at the bottom section of the washing chamber, a third connecting channel which connects said washing chamber to said re-extraction chamber, said third connecting channel being connected to said washing channel at a level which is above the level of said drain at the bottom section of the washing chamber said re-extraction chamber has an inlet for the supply of an acceptor phase, said inlet being adapted to disperse an acceptor phase and discharge it as a dispersion into said re-extraction chamber, a drain at the bottom section of the re-extraction chamber and wherein said second connecting channel which connects said re-extraction chamber and said extraction channel is connected to said re-extraction chamber at a level which is above the level of said drain at the bottom section of said re-extraction chamber.

2. Multiphase extractor according to claim 1, wherein said extraction chamber comprises a phase separation zone having an upper section and a lower section, said drain at the bottom of said extraction chamber is connected to the bottom section of said separation zone, and said first connecting channel is connected to the upper section of said separation zone.

3. Apparatus according to claim 1, wherein said second connecting channel connects the top section of the re-extraction chamber to the top section of the extraction chamber.

4. Apparatus according to claim 1, wherein said second connecting channel connects the bottom section of the re-extraction chamber to the top section of the extraction chamber.

5. Apparatus according to claim 1, wherein said second connecting channel connects the bottom section of the re-extraction chamber to the bottom section of the extraction chamber.

6. Apparatus according to claim 1, wherein the extraction chamber and the re-extraction chamber together with the washing chamber form a single separation stage, and a number of said separation stages are connected in series.

7. Multiphase extractor according to claim 1, wherein said washing chamber comprises a phase separation zone in the bottom section thereof, said phase separation zone having an upper section and a lower section, said drain at the bottom of said washing chamber is connected to the bottom section of said phase separation zone, and said third connecting channel is connected to the upper section of said phase separation zone.

8. Multiphase extractor according to claim 1, wherein said re-extraction chamber comprises a phase separation zone in the bottom section thereof said phase separation zone having an upper section and a lower section, said drain at the bottom of said re-extraction chamber is connected to the bottom section of said phase separation zone, and said second connecting channel is connected to the upper section of said phase separation zone.

9. Multiphase extractor of claim 1, wherein one or more of said extraction chamber, said washing chamber and said re-extraction chamber has a separation zone in the top section thereof.

* * * * *